US007861284B2

(12) United States Patent
Okamoto et al.

(10) Patent No.: US 7,861,284 B2
(45) Date of Patent: Dec. 28, 2010

(54) CONTROL METHOD AND SYSTEM OF CUSTOMER PREMISES APPARATUS AND GATEWAY

(75) Inventors: Chikashi Okamoto, Yokohama (JP); Takanori Yukimatsu, Yokohama (JP); Yoshimichi Kudo, Fujisawa (JP); Mayuko Tanaka, Yokohama (JP); Shigeto Oeda, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1068 days.

(21) Appl. No.: 10/291,743

(22) Filed: Nov. 12, 2002

(65) Prior Publication Data

US 2003/0217260 A1 Nov. 20, 2003

(30) Foreign Application Priority Data

May 15, 2002 (JP) .............................. 2002-139410

(51) Int. Cl.
*G06F 7/04* (2006.01)
(52) U.S. Cl. ..................................... 726/3; 726/4; 726/5
(58) Field of Classification Search ........................ None
See application file for complete search history.

(56) References Cited

U.S. PATENT DOCUMENTS

| | | | | |
|---|---|---|---|---|
| 4,731,841 A | * | 3/1988 | Rosen et al. ................. | 713/159 |
| 5,749,053 A | * | 5/1998 | Kusaki et al. ................ | 455/524 |
| 6,427,170 B1 | * | 7/2002 | Sitaraman et al. ............ | 709/226 |
| 6,526,581 B1 | * | 2/2003 | Edson ........................... | 725/74 |
| 6,580,950 B1 | * | 6/2003 | Johnson et al. ............... | 700/17 |
| 6,919,790 B2 | * | 7/2005 | Kanazawa ................... | 340/5.21 |
| 6,924,727 B2 | * | 8/2005 | Nagaoka et al. .............. | 340/3.1 |
| 7,024,177 B2 | * | 4/2006 | Bhasin et al. ................ | 455/411 |
| 7,036,738 B1 | * | 5/2006 | Vanzini et al. ............... | 235/486 |
| 2002/0116637 A1 | * | 8/2002 | Deitsch et al. .............. | 713/201 |
| 2002/0138761 A1 | * | 9/2002 | Kanemaki et al. ........... | 713/201 |
| 2002/0180581 A1 | * | 12/2002 | Kamiwada et al. ........... | 340/5.2 |

* cited by examiner

*Primary Examiner*—Benjamin E Lanier
(74) *Attorney, Agent, or Firm*—McDermott Will & Emery LLP

(57) ABSTRACT

An authentication information and a verification information are previously generated and the authentication information is stored to an authentication data generating apparatus, while the verification information is stored to a gateway. When a controller tries to make communication With a customer premises apparatus, the authentication data generating apparatus connected to the controller generates an authentication data using the authentication information and the gateway verifies the authentication data using the verification information. Moreover, the gateway restricts, when connected to the authentication data generating apparatus, the communication between the controller located in the outside of customer premises and the customer premises apparatus. Moreover, the gateway changes, while connected to the authentication data generating apparatus, an address of the customer premises apparatus and stores the changed address to the authentication data generating apparatus. The address of the customer premises apparatus is not informed to the controller provided in the outside of customer premises. Consequently, a system for safely controlling the customer premises apparatus from the outside of customer premises with the controller without bringing this controller into the customer premises to register a controller identification information to the gateway can be provided.

30 Claims, 12 Drawing Sheets

CONTROL METHOD AND SYSTEM OF CUSTOMER PREMISES APPARATUS AND GATEWAY

BACKGROUND OF THE INVENTION

The present invention relates to a control method and system and an apparatus for safely controlling a customer premises electronic apparatus (hereinafter, referred to as customer premises apparatus) enabling network communication with a controller from the outside of customer premises apparatus via a network.

In recent years, a customer premises apparatus such as home electric appliances and information apparatuses is provided with a network communication function and thereby it is now possible to control such customer premises apparatus with a controller such as a mobile phone and an exclusive small size terminal via the Internet.

Moreover, general households often use, at the time of connecting the customer premises apparatus to the Internet, the Internet connection service of ISP (Internet Service Provider). In this case, each customer premises apparatus is not connected in direct to the outside network, considering the procedures and expense required to enjoy the services and connects only the gateway to the outside network. Therefore, each customer premises apparatus is connected to the outside network via the gateway.

Here, since the data received by the customer premises apparatus always passes the gateway, the security function is concentrated, in some cases, to the gateway in order to alleviate a load for loading the functions of each customer premises apparatus. For example, when it is requested to control the customer premises apparatus from the outside network with a controller, the gateway first confirms that the controller is a legitimate apparatus which is allowed to control such customer premises apparatus and then relays communication between the controller and customer premises apparatus. A controller identification information such as an ID number and an encrypted key information for uniquely identifying the controller is previously registered manually and when it can be confirmed that the electronic apparatus for trying to control the customer premises apparatus has the registered controller identifying information, the gateway judges the electronic apparatus as the legitimate apparatus and relays communication. Thereby, the customer premises apparatus can be safely controlled from the external side without authentication of the controller.

In above techniques, it is required to take once the controller into the customer premises before the actual use in order to register the controller identifying information to the gateway. However, this process cannot be adapted to the controller which cannot be brought into the customer premises such as a controller which is built into a large size facilities such as automobile and cannot be removed and to the controller which is used in the business field and cannot be brought to the outside of the business field.

SUMMARY OF THE INVENTION

The present invention has been proposed considering the background explained above and an object of the present invention is to provide a system for safely controlling a customer premises apparatus with a controller from the external side of customer premises without the processes to bring the controller into the customer premises to register the controller identifying information to the gateway.

In view of solving the problems explained above, an authentication information and a verification information are generated previously, in the present invention and the authentication information is stored in an authentication data generating apparatus, while the verification information is stored in the gateway. When the controller tries to make communication with a customer premises apparatus, the authentication data generating apparatus connected to the controller generates an authentication data using the authentication information and the gateway verifies the authentication data using the verification information.

Moreover, in the present invention, the gateway restricts communication between the controller provided in the external side thereof and the customer premises apparatus, while the authentication data generating apparatus is connected.

Moreover, in the present invention, the gateway changes an address of the customer premises apparatus while the authentication data generating apparatus is connected and stores the changed address to the authentication data generating apparatus. The gateway does not inform the address of the customer premises apparatus to the controller in the external side.

Moreover, in the other solution of the present invention, storing of authentication information and generation of authentication data are conducted with the controller in place of the authentication data generating apparatus.

The control procedures of the present invention are as follows.

First, an authentication information such as an encrypted key information is previously stored into an authentication data generating apparatus which may be carried easily and a verification information to verify that the authentication data generated using the authentication information is the legitimate data is registered to the gateway. Here, when an intrinsic user information such as a fingerprint information and password is defined as the authentication information, it is not required to store the authentication information to the authentication data generating apparatus. In this case, the authentication data generating apparatus uses, as the authentication information, the information such as fingerprint and password which are inputted by a user to manipulate the controller is used for generation of the authentication data. Moreover, the gateway stores an address of a customer premises apparatus into the authentication data generating apparatus.

Next, in the case of controlling a customer premises apparatus using a controller from the external side of the customer premises apparatus, the authentication data generating apparatus is carried to the area where the controller is used and is then connected to the controller.

Next, the controller makes communication with the gateway to inform the address of the customer premises apparatus to be controlled. Next, the gateway confirms that the transferred address of the customer premises apparatus is correct and then sends random numbers to the controller.

Next, the controller transfers the received random numbers to the authentication data generating apparatus. Here, when the authentication information is not stored in the authentication data generating apparatus, the controller reads the user intrinsic information to defined as the authentication information and transfers this information to the authentication data generating apparatus together with random number. Here, when the authentication data generating apparatus is provided with an apparatus to read the authentication information, the authentication data generating apparatus can obtain in direct the authentication information.

Next, the authentication data generating apparatus executes calculation using the random numbers and authentication information to generate an authentication data. Next, the authentication data generating apparatus transfers the generated authentication data to the controller and the controller transmits the received authentication data to the gateway.

Next, the gateway verifies the authentication data received using the verification information registered to the gateway and relays, when the verification is successful, the communication between the controller and customer premises apparatus.

When a user stays in the household and it is unnecessary to control the customer premises apparatus from the controller provided at the external side, a user keeps the authentication data generating apparatus and the gateway under the connected condition. The gateway does not relay the communication between the controller provided at the external side and the customer premises apparatus while the authentication data generating apparatus is connected. Moreover, the gateway changes the address assigned to the customer premises apparatus and stores the changed address to the authentication data generating apparatus.

Here, it is also possible to give the gateway function to the customer premises apparatus without providing the gateway. In this case, the customer premises apparatus confirms legitimacy of the controller and controls the communication with the controller.

The authentication data generating apparatus is not required to be an apparatus and may be a component which can be carried easily and is capable of writing the data or calculating the data such as an IC card, IC chip with memory or memory card for music, etc. Moreover, it is also possible that the controller which may be carried easily such as a mobile phone is registered to the gateway and such registered controller is used as the authentication data generating apparatus for controlling the customer premises apparatus from the other controller such as the built-in controller of an automobile.

The number of authentication data generating apparatuses is not limited to only one and a plurality of authentication data generating apparatuses may be used. When the authentication data generating apparatus is used in the plural numbers, while all registered authentication data generating apparatuses are connected to the gateway, the gateway restricts the communication between the controller in the external side and the customer premises apparatus and changes the address during this period.

In the operation where a user connects frequently the authentication data generating apparatus to the gateway, since the address of the customer premises apparatus is also changed frequently, the address of the customer premises apparatus may be used without use of random numbers when the authentication data generating apparatus generates the authentication data. In this case, the gateway is not required to transmit the random numbers to the controller.

In the case where storage of authentication information and generation of authentication data are not performed with the authentication data generating apparatus but with the controller, the verification information previously generated with the controller provided in the external side of the customer premises apparatus is stored to the authentication data generating apparatus and thereafter the authentication data generating apparatus is carried to the gateway to store the verification information and the controller generates the authentication data at the time of communication.

According to the present invention explained above, the authentication information is stored to the authentication data generating apparatus and the verification information is stored in the gateway by previously generating the authentication information and verification information. When the controller tries communication with the customer premises apparatus, the authentication data generating apparatus connected to the controller generates the authentication data using the authentication information and the gateway verifies the authentication data using the verification information. Therefore, since the controller identification information is registered to the gateway, a system that the customer premises apparatus is safely controlled from the external side can be established without bringing the controller into the customer premises.

Moreover, according to the present invention as explained above, when the intrinsic user information is defined as the authentication information, if the authentication data generating apparatus is stolen, this apparatus is never used illegally. When authentication information of a person other than the registered legitimate user is inputted to the authentication data generating apparatus, an erroneous authentication data is generated and thereby verification by the gateway is failed.

Moreover, according to the present invention explained above, while the authentication data generating apparatus is connected, the gateway restricts the communication between the controller provided in the external side and the customer premises apparatus. Therefore, if the authentication data generating apparatus is copied, the customer premises apparatus is never controlled illegally while a user stays at home and the authentication data generating apparatus is connected to the gateway. In addition, when communication from the controller provided at the external side is detected during this period, such communication can be judged as illegal communication. Namely, unfair communication can be found easily.

Moreover, according to the present invention explained above, the gateway changes an address of the customer premises apparatus while the authentication data generating apparatus is connected thereto. Therefore, if the authentication data generating apparatus is copied, the customer premises apparatus is never controlled illegally after a user comes back to his house to connect the authentication data generating apparatus to the gateway.

Moreover, according the present invention explained above, the authentication information and verification information are previously generated, the verification information is stored into the gateway via the authentication data generating apparatus. When the controller tries to make communication with the customer premises apparatus, the controller generates the authentication data using the authentication information and the gateway verifies the authentication data using the authentication information. Therefore, a system for safely controlling the customer premises apparatus from the external side can be attained without bringing the controller into the household because the controller identification information is registered to the gateway.

Moreover, according to the present invention as explained above, when the verification information is registered to the gateway via the authentication data generating apparatus, the gateway is capable of authenticating the controller. Accordingly, it is no longer required to connect the authentication data generating apparatus for generation of authentication data on the occasion of controlling the customer premises apparatus with the controller.

DESCRIPTION OF THE PREFERRED EMBODIMENTS

The preferred embodiments of the present invention will be explained with reference to the accompanying drawings.

The first embodiment of the present invention will be explained.

First, the schematic structure of the control system in this embodiment will be explained with reference to FIG. 1.

Figure 1:
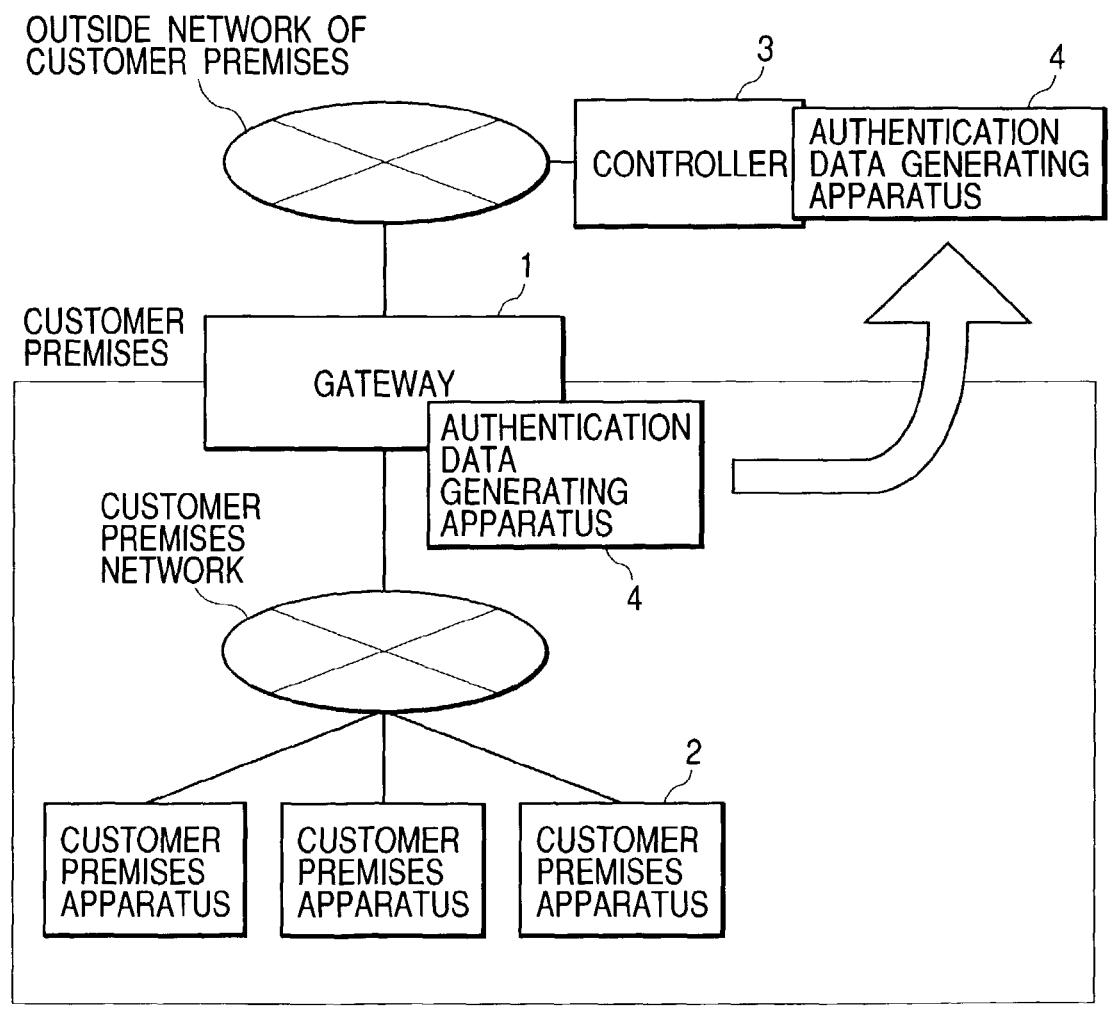
FIG. 1 schematically illustrates a structure of a control system in the embodiment of the present invention.

In FIG. 1, the numeral 1 designates a gateway. The gateway is a device located at the connecting point of a plurality of networks to control the communications among the networks. Moreover, the gateway writes the information required for authentication and communication into an authentication data generating apparatus. Moreover, the gateway verifies the authentication data. In this embodiment, the gateway is located at the position between the customer premises apparatus network provided within the household and outside network of customer premises provided in the outside of household in order to control the communications between the outside network of customer premises and the customer premises apparatus network.

Numeral 2 designates a customer premises apparatus. The customer premises apparatus means an electronic apparatus provided at the internal side of household to be connected to the gateway 1 via the customer premises apparatus network. The customer premises apparatus 2 is controlled with a controller via the network. As an example of the customer premises apparatus 2, a network-aided air-conditioner may be listed.

Numeral 3 designates a controller. The controller is an electronic apparatus for controlling the customer premises apparatus 2 via the network by utilizing the authentication data generating apparatus. In this embodiment, the controller 3 is located on the customer premises apparatus network to control the customer premises apparatus 2 via the gateway 1. As an example of controller 3, a PDA, a mobile phone and an exclusive small size terminal may be listed. Numeral 4 designates an authentication data generating apparatus. The authentication data generating apparatus 4 stores authentication information and also generates an authentication data together with the other information. Moreover, this authentication data generating apparatus 4 stores an address of the customer premises apparatus 2. As an example of the authentication data generating apparatus 4, an IC card, an IC chip with memory and a memory card for music may be listed.

Figure 2:
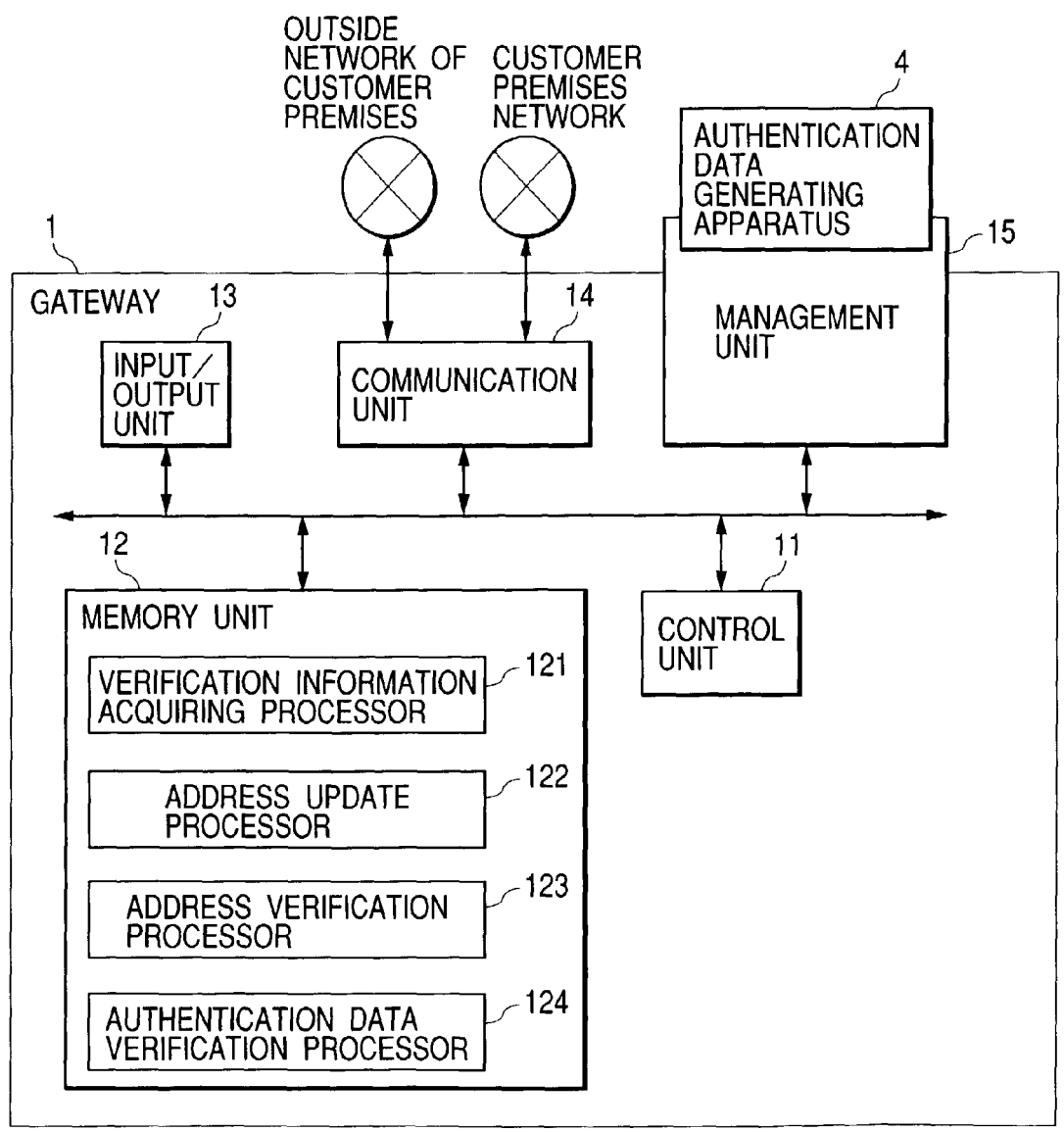
FIG. 2 schematically illustrates a structure of a gateway 1 in the embodiment of the present invention.

Next, each apparatus forming the control system will be explained. FIG. 2 schematically illustrates a structure of the gateway 1 of the embodiment.

As illustrated in FIG. 2, the gateway 1 of this embodiment comprises a control unit 11, a memory unit 12, an input/output unit 13, a communication unit 14 and a management unit 15.

The controller 11 controls the entire operations of the gateway 1. The memory unit 12 stores various processing programs for controlling entire operations of the gateway 1, setting information inputted from the input/output unit 13 and data received with the communication unit 14 or management unit 15. As an example of the memory unit 12, a memory, disk and a tape may be listed.

The input/output unit 13 displays the setting information, communication condition or guidance to a user and also causes a user to make various settings. As an example of the input/output unit 13, a button, a switch, a remote-controller, a lamp or a display may be listed.

The communication unit 14 is provided to make communication with the other electronic apparatuses. In this embodiment, this apparatus 14 makes communication between the outside network and the customer premises apparatus network. The management unit 15 read or write data from or to the authentication data generating apparatus 4 and performs management of arithmetic instructions or the like.

Moreover, the gateway 1 comprises a verification information acquiring processor 121, an address update processor 122, an address verification processor 123 and an authentication data verification processor 124.

The verification information acquiring processor 121 transmits, in the management unit 15, a verification information request to the authentication data generating apparatus 4, receives the verification information from the authentication data generating apparatus 4 in order to store this information to the memory unit 12.

The address update processor 122 updates, when the authentication data generating apparatus 4 is connected to the management unit 15, an address of the customer premises apparatus 2 and stores the updated address to the authentication data generating apparatus 4 in the management unit. Moreover, this processor stores an address of the customer premises apparatus 2 into the memory unit 12. Moreover, this processor restricts, when the communication unit 14 receives a communication from the controller 3, this communication and issues an alarm.

The address verification processor 123 verifies that the address of the customer premises apparatus 2 included in the communication received by the communication unit 14 from the controller 3 is correct. When this address is not correct, the communication unit 14 restricts the communication between the outside network and the customer premises apparatus network.

The authentication data verification processor 124 transmits the authentication data request including random numbers to the controller 3 from the communication unit 14 and verifies the authentication data received from the controller 3 in the communication unit 14 using the verification information stored in the memory unit 12. If verification fails, the communication unit 14 restricts communication between the outside network and the customer premises apparatus network.

A program to control the gateway 1 to execute the functions as the verification information acquiring processor 121, address update processor 122, address verification processor 123 and authentication data verification processor 124 is stored in the memory 12 and is executed by the control unit 11.

Figure 3:
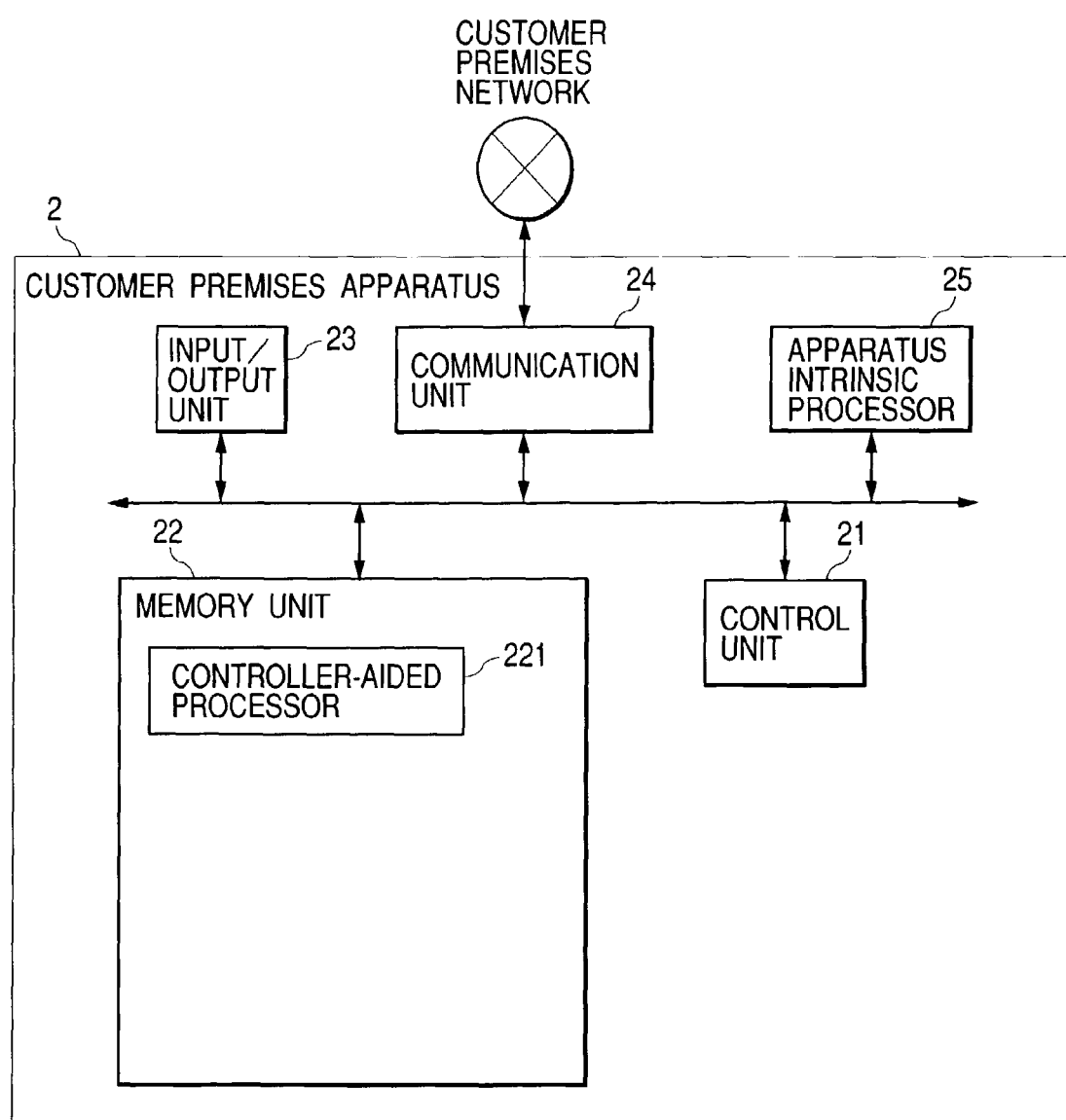
FIG. 3 schematically illustrates a structure of a customer premises apparatus 2 in the embodiment of the present invention.

FIG. 3 illustrates a schematic structure of the customer premises apparatus 2 of this embodiment. The customer premises apparatus 2 of this embodiment illustrated in FIG. 3 comprises the control unit 21, memory unit 22, input/output unit 23, communication unit 24 and an apparatus intrinsic processor 25. The controller 21 controls entire operations of the customer premises apparatus 2. The memory unit 22 stores various processing programs for controlling entire operations of the customer premises apparatus 2, setting information inputted from the input/output unit 23 and data received with the communication unit 24. As an example of the memory unit 22, memory disk and tape may be listed.

The input/output unit 23 displays and sets the setting information, communication condition and guidance for a user. As an example of the input/output unit 23, button, switch, remote-controller, lamp and display may be listed.

The communication unit 24 is provided for communication with the other electronic device. In this embodiment, the communication is conducted with the gateway 1 via the customer premises apparatus network.

The apparatus intrinsic processor 25 executes the intrinsic processes of the customer premises apparatus 2 and is controlled by the controller 3.

The customer premises apparatus 2 also includes a controller-aided processor 221. The controller-aided processor 221 is aided to control from the controller 3 using the apparatus intrinsic processor 25. A program for controlling the customer premises apparatus 2 to function as the controller-aided processor 221 is stored in the memory 22 and is executed with the controller 21.

Figure 4:
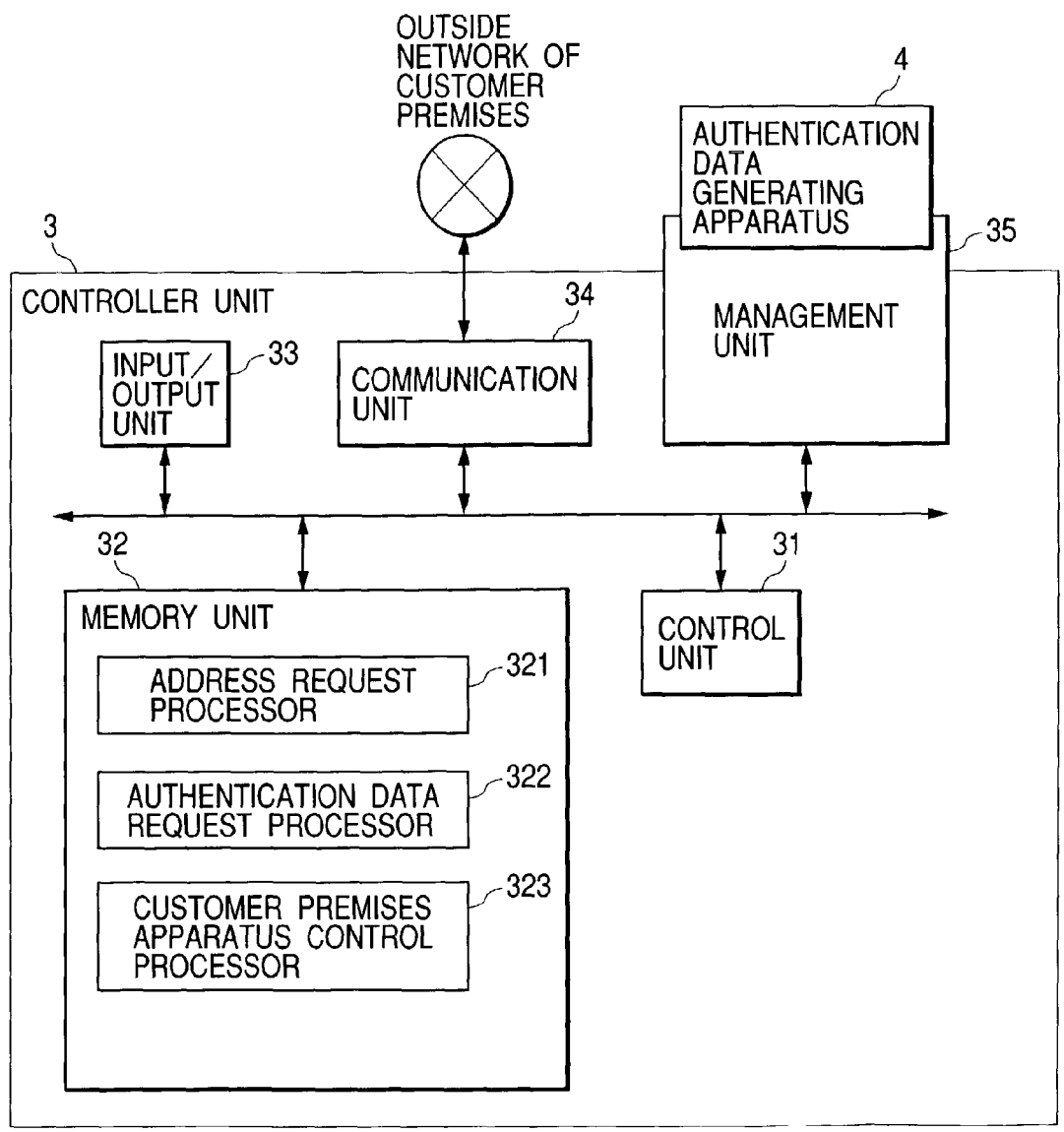
FIG. 4 schematically illustrates a structure of a controller 3 in the first embodiment of the present invention.

FIG. 4 illustrates a schematic structure of the controller 3 in this embodiment. The controller 3 of this embodiment, as illustrated in FIG. 4, comprises the control unit 31, memory unit 32, input/output unit 33, communication unit 34 and management unit 35.

The control unit 31 controls entire operations of the controller 3. The memory unit 32 stores various programs for controlling entire operations of the controller 3, setting information inputted from the input/output unit 33 and data received with the communication unit 34 or management unit 35. As an example of memory unit 32, memory, disk and tape may be listed.

The input/output unit 33 is provided to display and set the setting information, communication condition and guidance to a user. As an example of the input/output unit 33, button, switch, remote-controller, lamp and display may be listed.

The communication unit 34 is provided for making communication with the other electronic apparatuses. In this embodiment, communications are conducted with the gateway 1 via the outside network of the customer premises apparatus.

The management unit 35 reads and writes data from and to the authentication data generating apparatus 4 for the management of arithmetic instructions or the like.

Moreover, the controller 3 comprises an address request processor 321, an authentication data request processor 322 and a customer premises apparatus control processor 323.

The address request processor 321 requests an address of the customer premises apparatus 2 required for the communication unit 34 to make communication for control to the customer premises apparatus 2 to the authentication data generating apparatus 4 in the management unit 35.

The authentication data request processor 322 requests the authentication data to the authentication data generating apparatus 4 in the management unit 35 in order to generate in the communication unit 34 the authentication data using the random numbers received from the gateway 1.

The customer premises apparatus control processor 323 controls the customer premises apparatus 2 from the communication unit 34 via the network.

A program for controlling the controller 3 to function as the address request processor 321, authentication data request processor 322 and customer premises apparatus control processor 323 is stored in the memory unit 32 and is executed from the control unit 31.

Figure 5:
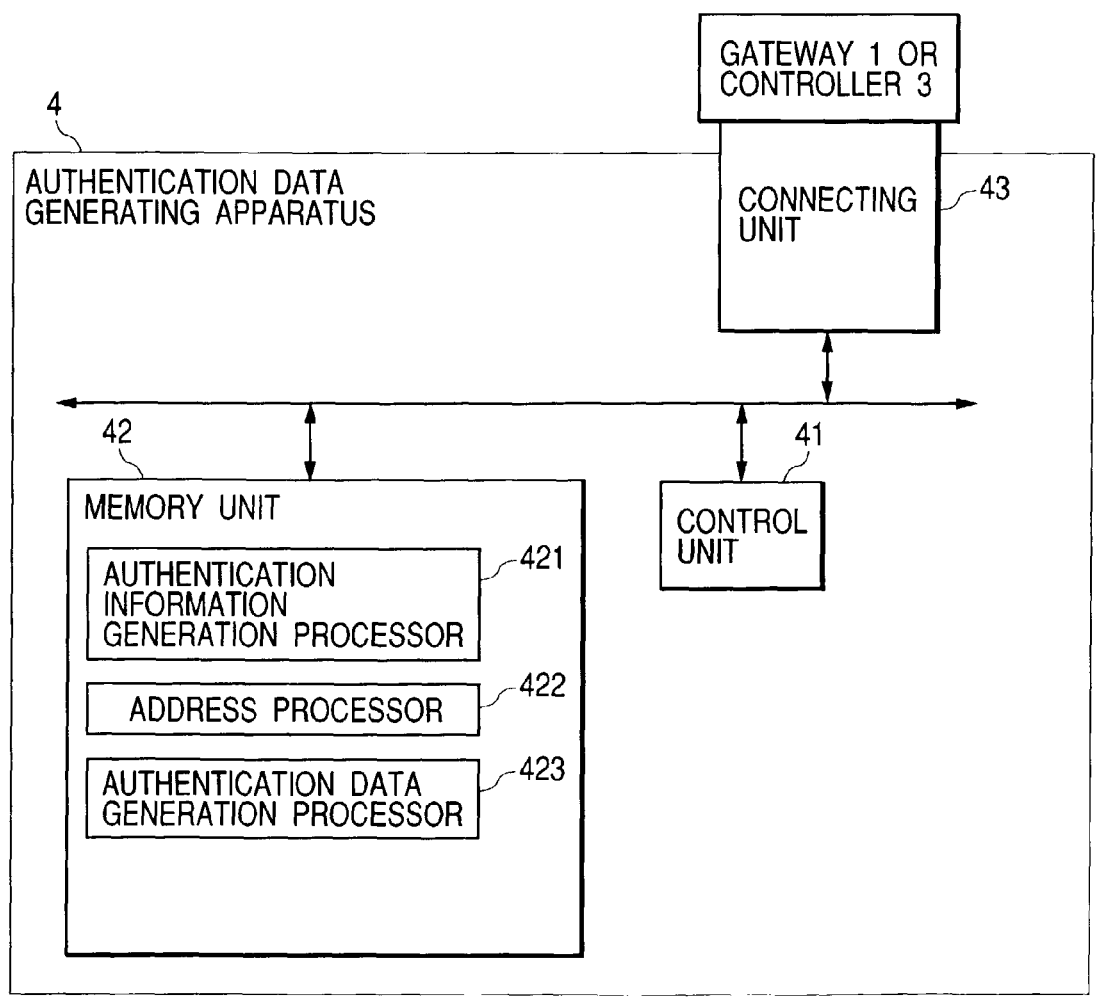
FIG. 5 schematically illustrates a structure of an authentication data generating apparatus 4 in the embodiment of the present invention.

FIG. 5 illustrates a schematic structure of the authentication data generating apparatus 4 of this embodiment. As illustrated in FIG. 5, the authentication data generating apparatus 4 of this embodiment comprises the control unit 41, memory unit 42 and a connecting unit 43.

The control unit 41 controls entire operations of the authentication data generating apparatus 4. The memory unit 42 stores various process programs for controlling entire operations of the authentication data generating apparatus 4 and also stores data received with the connecting unit 43. As an example of the memory unit 42, memory, disk and tape may be listed.

The connecting unit 43 connects the authentication data generating apparatus 4 to the gateway 1 or controller 3 for the transmission and reception of data.

Moreover, the authentication data generating apparatus 4 comprises an authentication information generation processor 421, an address processor 422 and an authentication data generation processor 423.

The authentication information generation processor 421 generates a pair of the authentication information and the verification information required to verify the authentication data generated from the authentication information. The authentication information generated is stored in the memory unit 42, while the verification information is transferred to the gateway 1 in the connection unit 43.

The address processor 422 stores, in the connecting unit 43, the address of the customer premises apparatus 2 received from the gateway 1 to the memory unit 42 and also extracts the address of customer premises apparatus 2 from the memory unit 42 and then transfers this address to the controller 3.

The authentication data generation processor 423 generates the authentication data using the authentication information stored in the memory unit 42 and the information such as random numbers received from the controller 3 in the connecting unit 43.

A program for controlling the authentication data generating apparatus 4 to function as the authentication information generation processor 421, address processor 422 and authentication data generation processor 423 is stored in the memory unit 42 and is executed by the control unit 41.

Next, operations of the control system explained above will then be explained.

Figure 6:
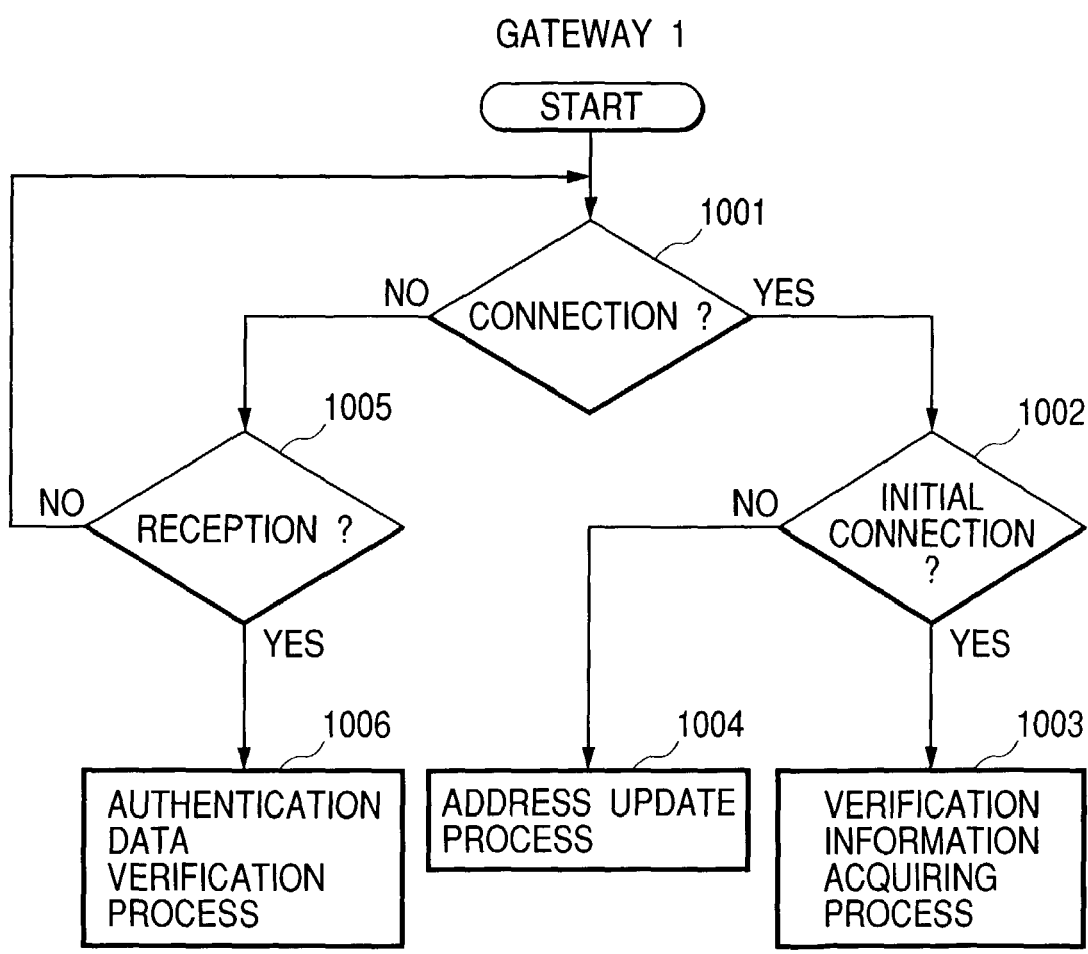
FIG. 6 illustrates a flow diagram for explaining schematic operations of the gateway 1 in the first embodiment of the present invention.

FIG. 6 is a flow diagram for explaining schematic operations of the gateway 1 of the embodiment of the present invention.

First, whether the authentication data generating apparatus 4 is connected to the management unit 15 or not is judged (step 1001).

When connected (YES in the step 1001), whether the connection of the authentication data generating apparatus is the initial connection or not is judged (step 1002). When the connection is the initial connection (YES in the step 1002), the verification information acquiring processor 121 executes the verification information acquiring process (step 1003). When the connection is not the initial connection (NO in the step 1002), the address update processor 122 executes the address update process (step 1004).

When not connected in the step 1001 (NO in the step 1001), the process is repeated from the step 1001 until the communication unit 14 receives communication from the controller 3. Upon reception (YES in the step 1005), the authentication data verification processor 123 executes the authentication data verification process (step 1006).

Figure 7:
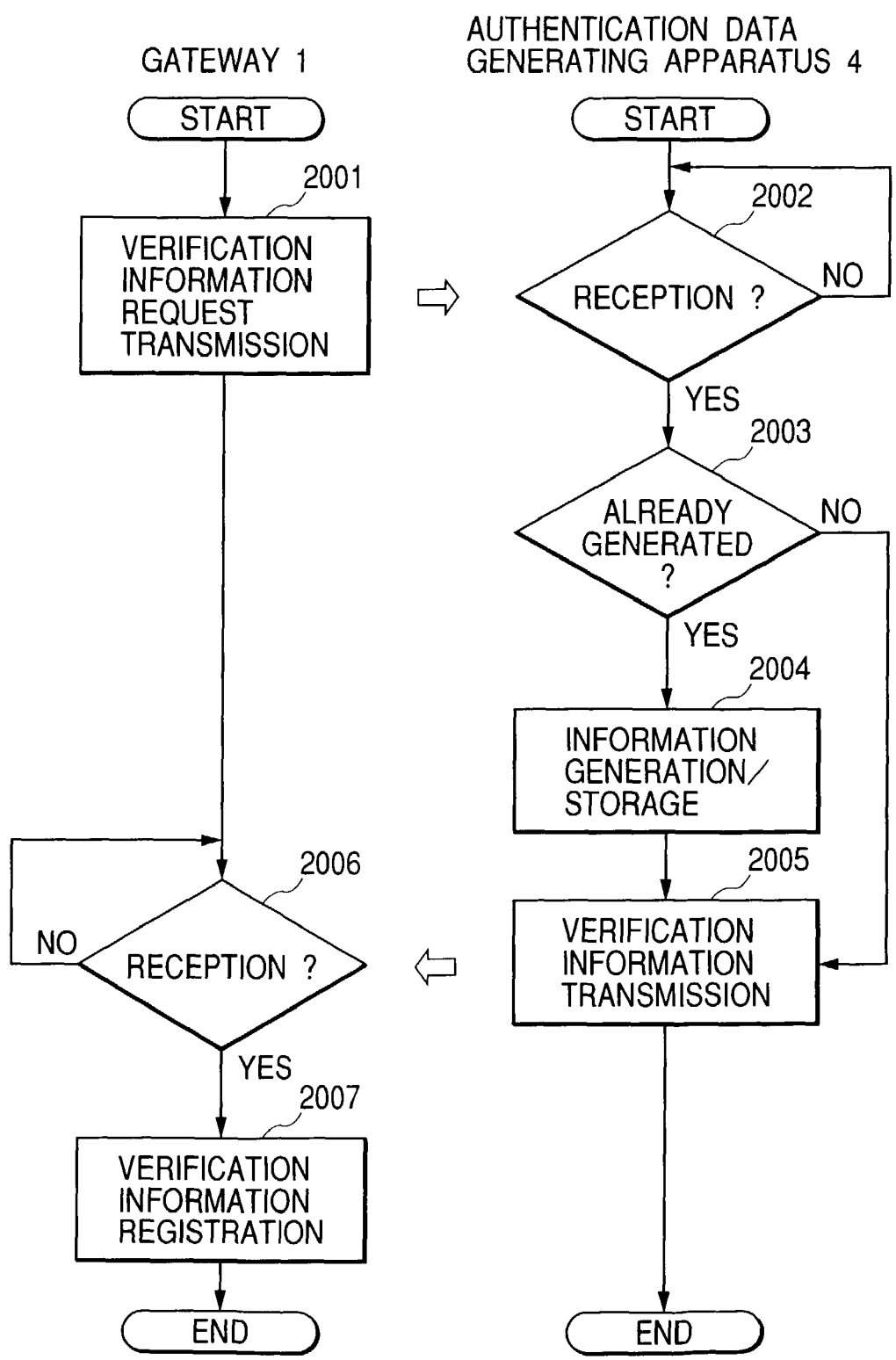
FIG. 7 illustrates flow diagrams for explaining schematic operations of the gateway 1 and authentication data generating apparatus 4 in the verification information acquiring process (step 1003) in the first embodiment of the present invention.

FIG. 7 illustrates a flow diagram for explaining schematic operations of the gateway 1 and authentication data generating apparatus 4 in the verification information acquiring process (step 1003) of the embodiment of the present invention.

First, in the gateway 1, the verification information acquiring processor 121 transmits, in the management unit 15, the verification information request to the authentication data generating apparatus 4 (step 2001). Next, when the connecting unit 43 receives, in the authentication data generating apparatus 4, the verification information request from the gateway 1 (YES in the step 2002), the authentication information generation processor 421 searches, in the memory unit 42, whether the authentication information is generated or not (step 2003). When not yet generated (NO in the step 2003), a pair of authentication information and verification information is generated and the authentication information is then stored in the memory unit 42 (step 2004).

Next, the connecting unit 43 transmits the verification information to the gateway 1 (step 2005). When already generated in the step 2003 (YES in the step 2003), the connecting unit 43 also transmits the verification information to the gateway 1 (step 2005).

Next, when the management unit 15 receives the verification information from the authentication data generating apparatus 4 in the gateway 1 (YES in the step 2006) the verification information acquiring processor 121 stores the received verification information to the memory unit 12 and then registers this information.

Figure 8:
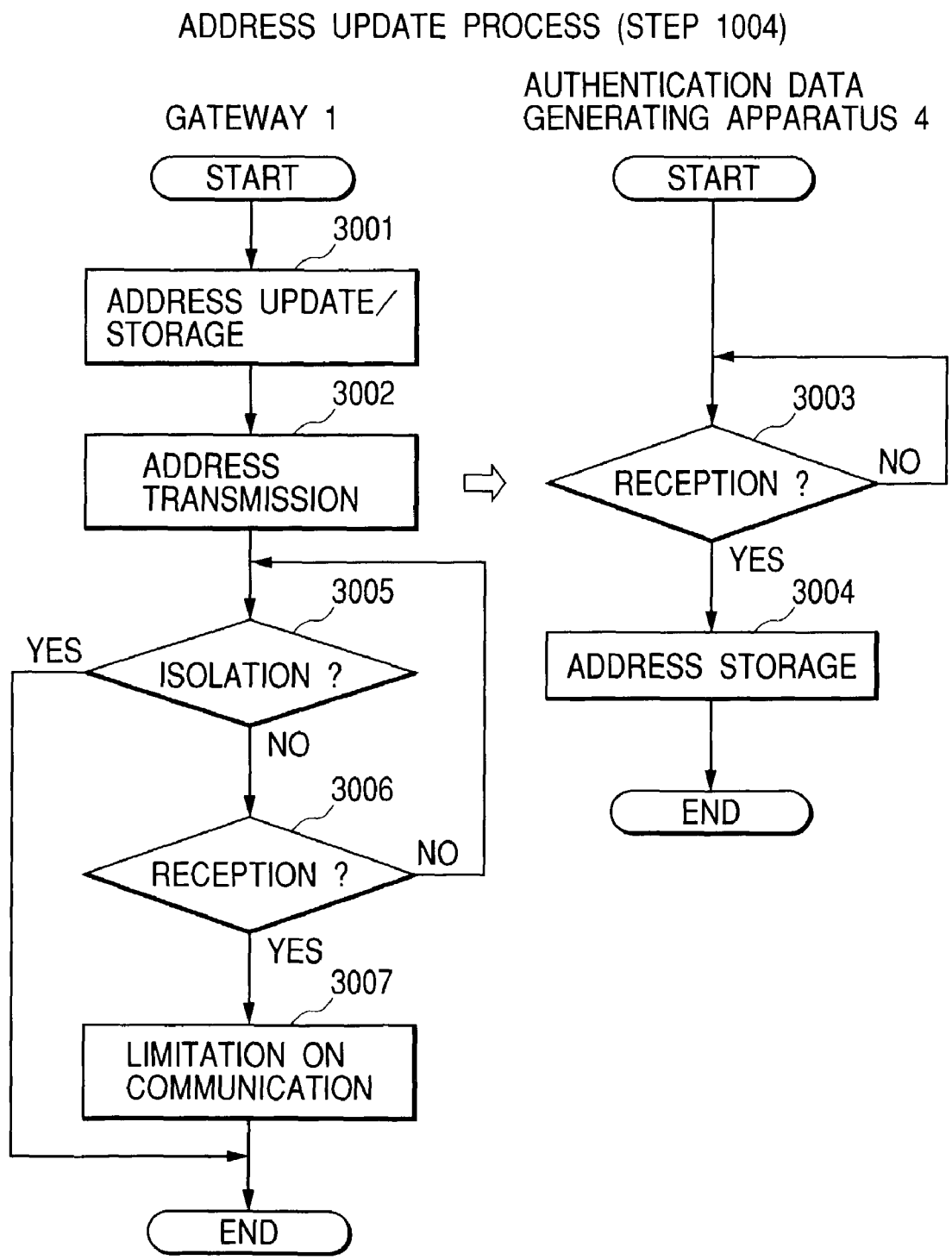
FIG. 8 illustrates flow diagrams for explaining schematic operations of the gateway 1 and authentication data generating apparatus 4 in the address update process (step 1004) in the first embodiment of the present invention.

FIG. 8 illustrates a flow diagram for explaining schematic operations of the gateway 1 and authentication data generating apparatus 4 in the address update process (step 1004) of the embodiment of the present invention.

First, in the gateway 1, the address update processor 122 updates an address of the customer premises apparatus 2 and then stores the updated address to the memory unit 12 (step 3001). Next, the management unit 15 transmits an address update message to the authentication data generating apparatus 4 (step 3002).

Next, when the connecting unit 43 receives the address update message from the gateway 1 in the authentication data generating apparatus 4 (YES in the step 3003), the address processor 422 stores the address of the customer premises apparatus 2 included in the address update message received to the memory unit 42 (step 3004).

The address update processor 122 of the gateway 1 having transmitted the address update message in the step 3002 searches next (step 3005) whether the authentication data generating apparatus 4 is isolated or not in the management unit 15. When isolation is detected (YES in the step 3005) the process is completed. If not isolated (NO in the step 3005), reception of communication from the controller 3 is searched in the management unit 14 (step 3006). If not received (NO in the step 3006), processes are repeated from the step 3005. When reception is detected (YES in the step 3006), the communication unit 14 restricts communication between the outside network and the customer premises apparatus network and issues an alarm (step 3007).

Figure 9:
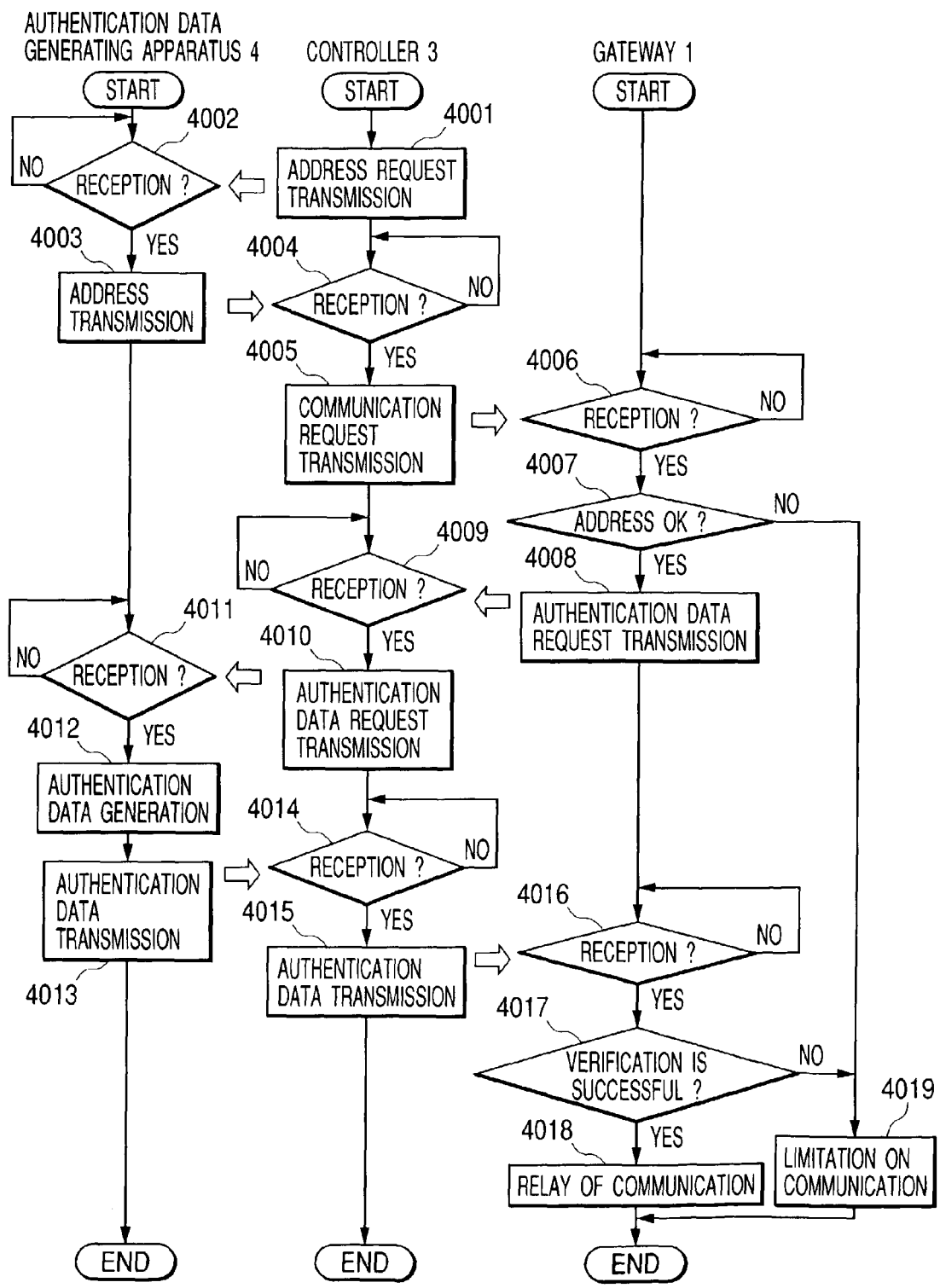
FIG. 9 illustrates flow diagrams for explaining schematic operations of the gateway 1, controller 3 and authentication data generating apparatus 4 in the authentication data verification process (step 1006) in the first embodiment of the present invention.

FIG. 9 is a flow diagram for explaining schematic operations of the gateway 1, controller 3 and authentication data generating apparatus 4 in the authentication data verification process of the embodiment of the present invention (step 1006).

First, in the controller 3, the address request processor 321 transmits an address request to the authentication data generating apparatus in the management unit 35 (step 4001). Next, when the connecting unit 43 receives the address request from the controller 3 (YES in the step 4002) in the authentication data generating apparatus 4, the address processor 422 extracts the address of the customer premises apparatus 2 stored in the memory unit 42 and transmits this address to the controller 3 in the connecting unit 43 (step 4003).

Next, in the controller 3, when the management unit 35 receives the address of customer premises apparatus 2 from the authentication data generating apparatus 4 (YES in the step 4004), the address request processor 321 generates a communication request to make communications to the address of customer premises apparatus 2 received and transmits this request to the gateway 1 in the communication unit 34 (step 4005).

Next, the communication unit 14 receives the communication request from the controller 3 in the gateway 1 (YES in the step 4006), the address verification processor 123 compares the address of customer premises apparatus 2 included in the received communication request with the address of customer premises apparatus 2 stored in the memory unit 42 to find out the matching (step 4007). If the matched address of customer premises apparatus 2 cannot be found (NO in the step 4007), the communication unit 14 restricts the communication between the outside network and the customer premises apparatus network and issues an alarm (step 4019). When the matched address of customer premises apparatus 2 is found in the step 4007 (YES in the step 4007), the authentication data verification processor 124 generates an authentication data request including random numbers and transmits this request to the controller 3 in the communication unit (step 4008).

Next, in the controller 3, when the communication unit 34 receives the authentication data request from the gateway 1 (YES in the step 4009), the authentication data request processor 322 transmits, in the management unit 35, the authentication data request to the authentication data generating apparatus 4 (step 4010).

Next, when the connecting unit 43 receives the authentication data request from the controller 3 in the authentication data generating apparatus 4 (YES in the step 4011), the authentication data generating apparatus 423 generates the authentication data using the random number included in the received authentication data request and the authentication information stored in the memory unit 42 (step 4012). Next, the connecting unit 43 transmits the generated authentication data to the controller 3 (step 4013).

Next, in the controller 3, when the management unit 35 receives the authentication data from the authentication data generating apparatus 4 (YES in the step 4014), the authentication data request processor 322 transmits the received authentication data to the gateway 1 in the communication unit 34 (step 4015).

Next, when the communication unit 14 receives the authentication data from the controller 3 in the gateway 1 (YES in the step 4016), the authentication data verification processor 124 verifies the received authentication data using the verification information stored in the memory unit 412 (step 4017). When the verification is successful (YES in the step 4017), the communication unit 14 relays communication between the customer premises apparatus network and outside network (step 4018). When the verification fails in the step 4017 (NO in the step 4017), the communication unit 14 restricts the communication between the customer premises apparatus network and the outside network and then issues an alarm (step 4019).

The first embodiment of the present invention is explained above.

According to this first embodiment, the authentication information and verification information are generated previously and the authentication information is stored in the authentication data generating apparatus 4, while the verification information in the gateway 1. When the controller 3 requests communication with the customer premises apparatus 2, the authentication data generating apparatus 4 connected to the controller 3 generates the authentication data using the authentication information and the gateway 1 verifies the authentication data using the verification information. Therefore, a system for safely controlling the customer premises apparatus 2 from the outside without bringing the controller 3 into the customer premises to register the controller identification information to the gateway 1 can be attained.

Moreover, according to the first embodiment explained above, when an intrinsic user information is defined as the authentication information, if the authentication data generating apparatus 4 is stolen, this apparatus is never used illegally. The reason is that when the authentication information of a person other than the registered legitimate user is inputted to the authentication data generating apparatus 4, an erroneous authentication data is generated and the verification in the gateway 1 fails.

Moreover, according to the first embodiment explained above, the gateway 1 restricts communications between the controller 3 in the outside of customer premises and the customer premises apparatus 2 while the authentication data generating apparatus 4 is connected thereto. Therefore, if the authentication data generating apparatus 4 is copied, the customer premises apparatus 2 is never controlled illegally while a user stays at home and the authentication data generating apparatus 4 is connected to the gateway 1. In addition, when communication from the controller provided in the outside of customer premises is detected during this period, such communication may be judged as an illegal communication and therefore an illegal communication can be found easily.

Moreover, according to the first embodiment explained above, the gateway 1 changes the address of customer premises apparatus 2 while the authentication data generating apparatus 4 is connected. Therefore, if the authentication data generating apparatus 4 is copied, the customer premises apparatus 2 is never controlled illegally after a user once returns to this home and connects the authentication data generating apparatus 4 to the gateway 1.

The second embodiment of the present invention will be explained below.

This embodiment corresponds to storing of authentication information and generation of authentication data in the first embodiment with the controller 3 in place of the authentication data generating apparatus 4. In the first embodiment, the verification information generated previously by the authentication data generating apparatus 4 in the customer premises is stored to the gateway 1 and the authentication data generating apparatus 4 is carried, for the communication, to the area to use the controller 3 to generate the authentication data by the authentication data generating apparatus 4. However, in this embodiment, alternatively, the verification information generated by the controller 3 at the outside of the customer premises is once stored to the authentication data generating apparatus 4 and is thereafter carried to the gateway 1 to store it to the gateway 1. Thereby, the controller 3 generates 3 the authentication data at the time of conducting communication. The part overlapped with the first embodiment may be omitted from explanation.

First, a schematic structure of the control system in this embodiment will be explained with reference to FIG. 1.

Connections of apparatuses forming the control system of this embodiment are similar to that in the first embodiment. However, in regard to the moving direction of the authentication data generating apparatus 4, the arrow mark in FIG. 1 is inverted. Namely, the authentication data generating apparatus 4 moves toward the gateway 1 in the customer premises from the controller 3 in the outside of customer premises.

Next, each apparatus forming the control system explained above will be explained.

A schematic structure of the gateway 1 of this embodiment corresponds to the structure wherein the address update processor 122 and address verification processor 123 of FIG. 2 are removed.

A schematic structure of the customer premises apparatus 2 of this embodiment is as illustrated in FIG. 3.

A schematic structure of the authentication data generating apparatus 4 of this embodiment corresponds to the structure wherein the authentication information generation processor 421, address processor 422 and authentication data generation processor 423 of FIG. 5 are removed.

Figure 10:
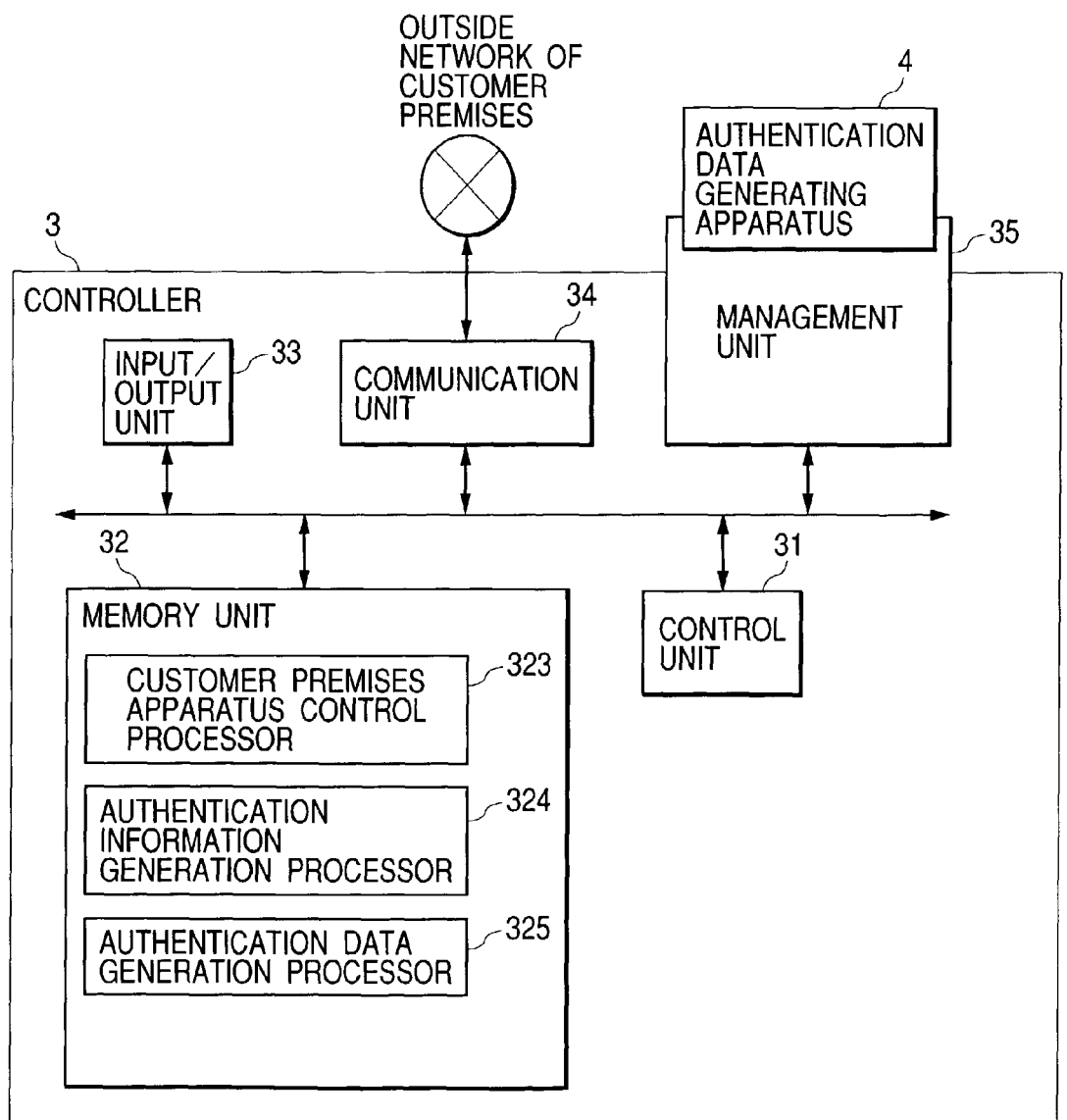
FIG. 10 illustrates a schematic structure of the controller 3 in the second embodiment of the present invention.

FIG. 10 illustrates a schematic structure of the controller 3 of this embodiment.

As illustrated in FIG. 10, the controller 3 of this embodiment comprises, like the first embodiment, the control unit 31, memory unit 32, input/output unit 33, communication unit 34 and management unit 35.

Moreover, the controller 3 also comprises the customer premises apparatus control processor 323, authentication information generation processor 324 and authentication data generation processor 325.

The customer premises apparatus control processor 323 controls the customer premises apparatus 2 from the communication unit 34 via the network.

The authentication information generation processor 324 generates a pair of the authentication information and the verification information required for verification of the authentication data generated from the authentication information. The authentication information generated is stored to the memory unit 32 and the verification information is transferred to the authentication data generating apparatus 4 in the management unit 35.

The authentication data generation processor 325 generates the authentication data using the authentication information stored in the memory unit 32 and the information such as random numbers received from the gateway 1 in the communication unit 34.

A program for controlling the controller 3 to function as the customer premises apparatus control processor 323, authentication information generation processor 324 and authentication data generation processor 325 is stored in the memory unit 32 and is executed with the control unit 31.

Figure 11:
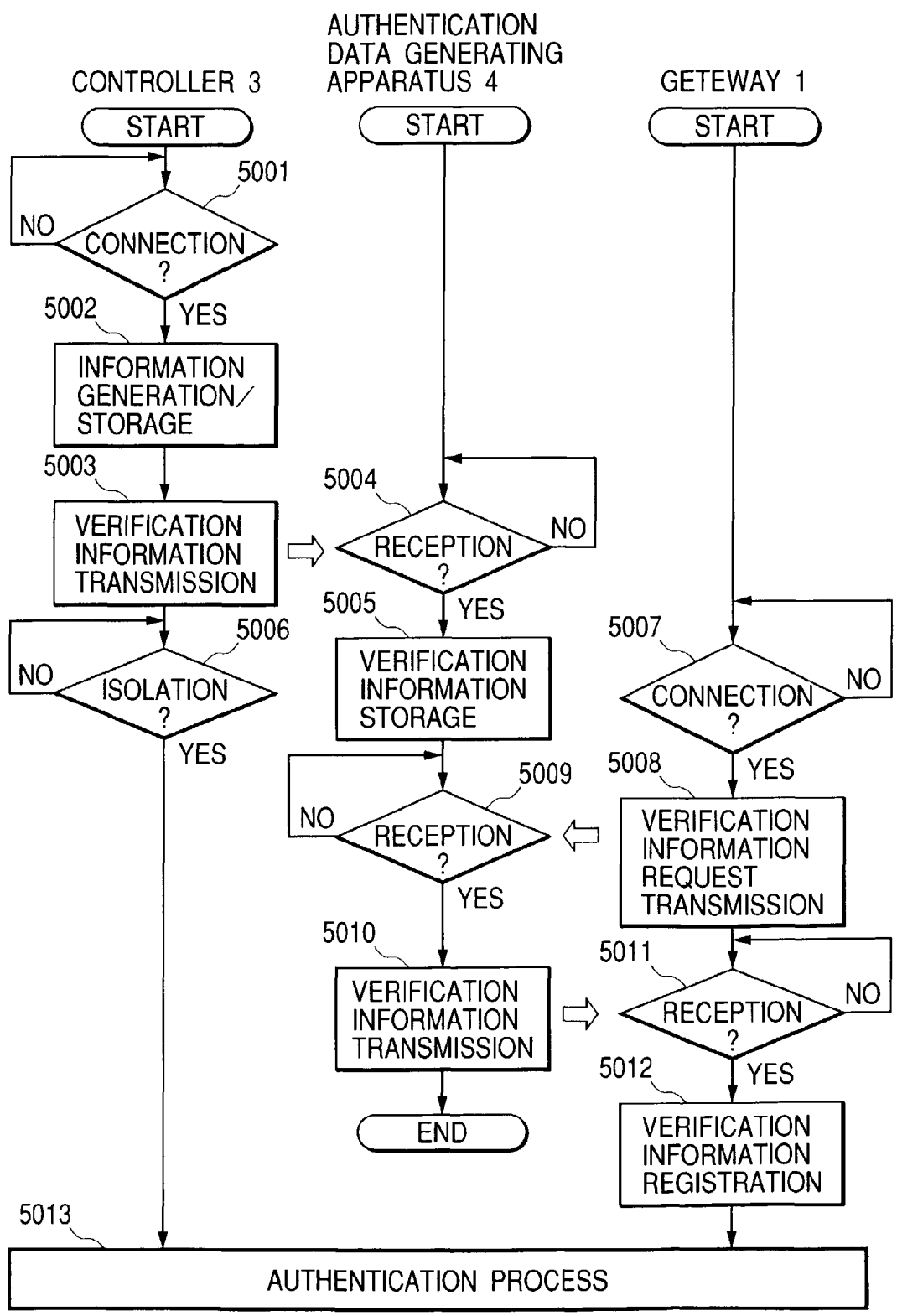
FIG. 11 illustrates flow diagrams for explaining schematic operations of the gateway 1, controller 3 and authentication data generating apparatus in the second embodiment of the present invention.

Next, operations of the control system will be explained. FIG. 11 is a flow diagram for explaining schematic operations of the gateway 1, controller 3 and authentication data generating apparatus 4 in this second embodiment.

First, when the management unit 35 of controller 3 recognizes connection of the authentication data generating apparatus 4 (YES in the step 5001), the authentication information generation processor 324 generates a pair of authentication information and verification information in the controller 3 and stores the authentication information to the memory unit 32 (step 5002). Next, the verification information is transmitted to the authentication data generating apparatus 4 in the management unit 35 (step 5003).

Next, when the connecting unit 43 receives the verification information from the controller 3 in the authentication data generating apparatus 4 (YES in the step 5004), it stores this information to the memory unit 42 (step 5005).

When the management unit 35 of controller 3 recognizes isolation of the authentication data generating apparatus 4 (YES in the step 5006), the management unit 35 goes to the authentication process in combination with the gateway 1 (step 5013).

Next, when the authentication data generating apparatus 4 is carried to the customer premises where the gateway 1 is provided from the outside of customer premises where the controller 3 is provided and the management unit 15 of the gateway 1 recognizes connection of the authentication data generating apparatus 4 (YES in the step 5007), the verification information acquiring processor 121 of the management unit 15 transmits a verification information request to the authentication data generating apparatus 4 in the gateway 1 (step 5008).

Next, in the authentication data generating apparatus 4, when the connecting unit 43 receives the verification information request from the gateway 1 (YES in the step 5009) this connecting unit 43 transmits the verification information stored in the memory unit 42 to the gateway 1 (step 5010).

Next, when the management unit 15 receives the verification information from the authentication data generating apparatus 4 in the gateway 1 (YES in the step 5011) the verification information acquiring processor 121 stores the received verification information to the memory unit 12 and registers this information (step 5012).

Next, the authentication process in combination with the controller 3 is started (step 5013).

Figure 12:
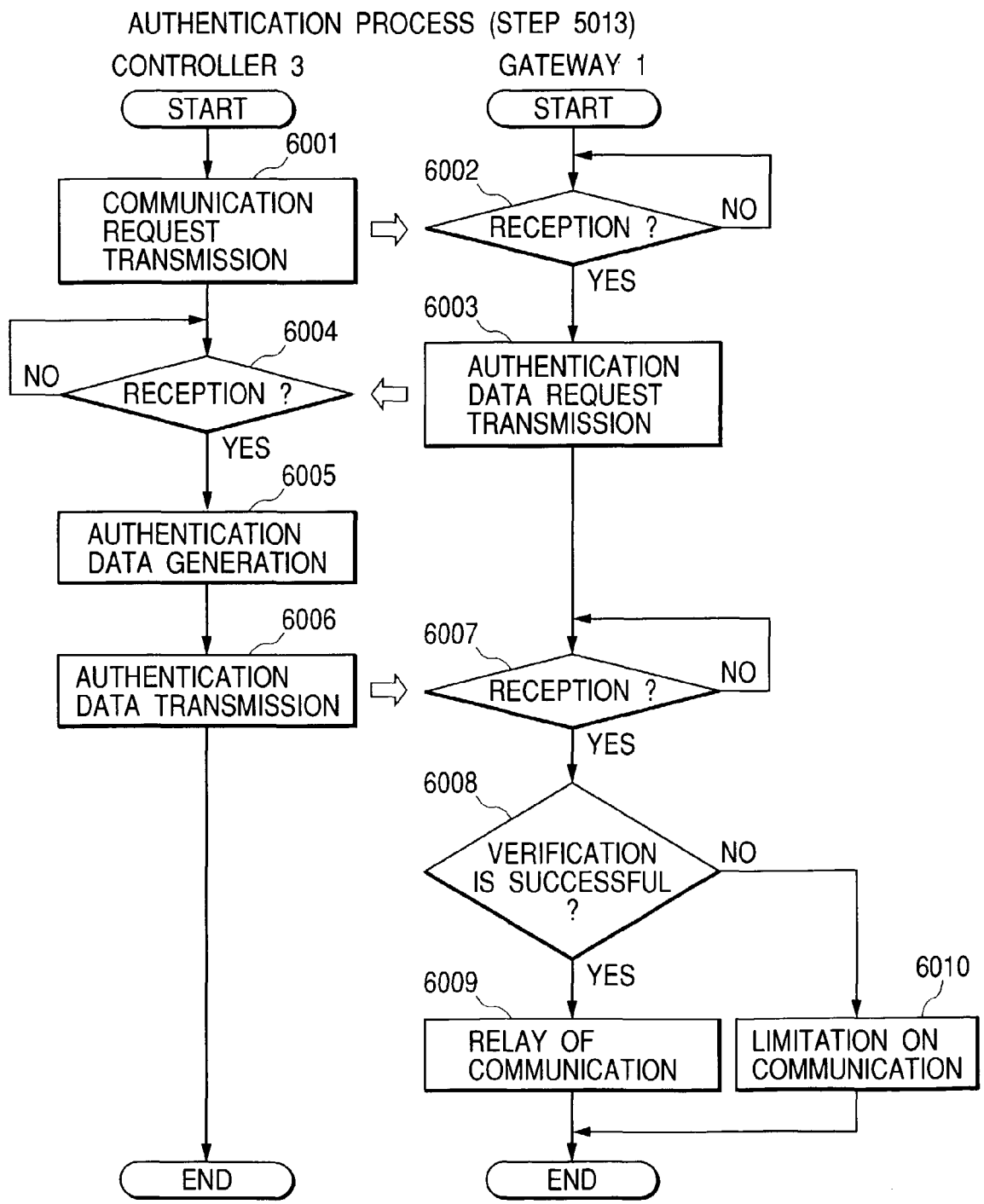
FIG. 12 illustrates flow diagrams for explaining schematic operations of the gateway 1 and controller 3 in the authentication process (step 5013) in the second embodiment of the present invention.

FIG. 12 illustrates a flow diagram for explaining the schematic operations of the gateway 1 and controller 3 in the authentication process (step 5013) of this embodiment.

First, the customer premises apparatus control processor 323 generates a communication request with the customer premises apparatus 2 generates in the controller 3 and then transmits this request to the gateway 1 in the communication unit 34 (step 6001).

Next, when the communication unit 14 receives the communication request from the controller 3 in the gateway 1 (YES in the step 6002), the authentication data verification processor 124 generates an authentication data request including the random numbers and transmits this request to the controller 3 in the communication unit 14 (step 6003).

Next, when the communication unit 34 receives the authentication data request from the gateway 1 in the controller 3 (YES in the step 6004), the authentication data generating processor 325 generates the authentication data using the random numbers included in the received authentication data request and the authentication information stored in the memory unit 32 (step 6005). Next, the communication unit 34 transmits the generated authentication data to the gateway 1 (step 6006).

Next, when the communication unit 14 receives the authentication data from the controller 3 in the gateway 1 (YES in the step 6007), the authentication data verification processor 124 verifies the authentication data using the verification information stored in the memory unit 12 (step 6008). When the verification is successful (YES in the step 6008), the communication unit 14 relays the communication between the customer premises apparatus network and the outside network of the customer premises (step 6009). When the verification fails in the step 6008 (NO in the step 6008), the communication unit 14 restricts communications between the customer premises apparatus network and the outside network of the customer premises and issues an alarm (step 6010).

The second embodiment of the present invention has been explained above.

According to such second embodiment, since the verification information to authenticate the controller 3 is registered to the gateway 1 via the authentication data generating apparatus 4 which may be easily carried, a system for safely controlling the customer premises apparatus 2 from the outside of customer premises without bringing the controller 3 into the customer premises to register the controller identification information to the gateway 1 can be obtained.

In this embodiment, the gateway 1 and the customer premises apparatus 2 are prepared separately and the gateway 1 controls communication between the controller 3 and the customer premises apparatus 2 by confirming legitimacy of the controller 3 as the communication partner of the customer premises apparatus 2, but it is also possible to give the gateway function to the customer premises apparatus 2 without providing the gateway 1. In this case, the customer premises apparatus 2 confirms legitimacy of the controller 3 and controls communication with the controller 3. Here, explanation about each apparatus forming the control system and explanation about operations of the control system in the embodiment of the present invention may also be exchanged with each other by reading the gateway 1 as the customer premises apparatus 2 but the address update processor 123 in FIG. 2 and the step 4007 in FIG. 9 are omitted.

In the embodiments of the present invention, the authentication data is generated using random numbers and authentication information but when a user frequently connects the authentication data generating apparatus 4 to the gateway 1, it is possible to generate the authentication data using the address of customer premises apparatus 2 and the authentication information because the address of customer premises apparatus 2 is often changed. In this case, the gateway 1 is not required to send the random numbers to the controller 3.

Moreover, in the embodiments of the present invention, the authentication data generating apparatus 4 generates and stores the authentication information but when an intrinsic user information such as fingerprint information and password is used as the authentication information, it is no longer required to store the authentication information to the authentication data generating apparatus 4. In this case, the authentication data generating apparatus 4 uses the fingerprint and password inputted by a user to manipulate the controller 3 as the authentication information for generation of authentication data.

Moreover, in the embodiments of the present invention, only one authentication data generating apparatus 4 is used but it is also possible to use a plurality of authentication data generating apparatuses 4. In this case, while all authentication data generating apparatuses 4 registered are connected to the gateway 1, the gateway 1 inhibits communication between the controller in the outside of customer premises and the customer premises apparatus 2 and changes the address of customer premises apparatus 2.

Moreover, in the embodiments of the present invention, the gateway 1 is used as an apparatus located at the interface between the customer premises apparatus network and the outside network of the customer premises apparatus for management of communications but this gateway 1 may be replaced with other devices such as a router, modem and firewall, etc.

In addition, in the embodiments of the present invention, the gateway 1 verifies the authentication data but this data may be verified with the customer premises apparatus 2 in place of the gateway 1.

Moreover, in the embodiments of the present invention, the customer premises apparatus 2 and the authentication data generating apparatus 4 are provided separately but when the customer premises apparatus 2 is also provided with a small size device which can be removed and carried easily, this small size device may be used as the authentication data generating apparatus 4.

Moreover, in the embodiments of the present invention, the controller 3 and the authentication data generating apparatus 4 are provided separately but when the controller 3 such as a mobile phone which may be carried easily is registered to the gateway 1 and the customer premises apparatus 2 is controlled with the other controller such as the controller built into an automobile, the registered controller may be used as the authentication data generating apparatus 4.

Moreover, in the embodiments of the present invention, the authentication data generating apparatus 4 is used as a device to generate the authentication data, but this means is not always required to be a device and may be replaced with an IC card, IC chip with memory and memory card for music which assures easy transportation, write of data and calculation.

Moreover, in the embodiments of the present invention, legitimacy of controller 3 is confirmed by verifying the authentication data but the encrypted data may also be used in addition to authentication.

Moreover, in the embodiments of the present invention, the authentication data generating apparatus 4 makes communication with connection to the gateway 1 or controller 3 but such connection may be realized with the contact connection or non-contact connection.

As explained above, according to the present invention, a system for safely controlling the customer premises apparatus 2 with the controller 3 from outside of the customer premises without bringing the controller 3 into the customer premises to register the controller identification information to the gateway 1 can be provided.

What is claimed is:

1. A method of controlling a customer premises apparatus as an electronic apparatus which is located in a customer premises apparatus network for making communication, comprising the steps that:

a gateway coupling between the customer premises apparatus network and a network outside of customer premises verifies connection with an authentication data generating apparatus which may be carried and which generates authentication data used for a verification of the connection;

said gateway denies a connection from a controller which is located in the network outside of customer premises to control said customer premise apparatus via the customer premise apparatus network when said authentication data generating apparatus is attached to the gateway in the customer premises apparatus network; and said gateway allows the connection from a controller located in the network outside of customer premises when said authentication data generating apparatus is not attached to the gateway in the customer premises apparatus network but is attached to said controller.

2. A method of controlling a customer premises apparatus according to claim 1, comprising the steps that:

said gateway changes, when said authentication data generating apparatus is connected, an address of said customer premises apparatus and then stores this address;

said gateway transmits said changed address to said authentication data generating apparatus; and said authentication data generating apparatus stores said received address.

3. A method of controlling a customer premises apparatus according to claim 1, comprising the steps that:

said gateway transmits, when said authentication data generating apparatus is connected, a verification information request to said authentication data generating apparatus;

whether said authentication data generating apparatus has generated authentication information or not is verified, said authentication information is used for generating the authentication data;

said authentication data generating apparatus generates and records a pair of authentication information and verification information when the authentication information is not yet generated;

said authentication data generating apparatus transmits the recorded verification information to said gateway; and said gateway records said received verification information.

4. A method of controlling a customer premises apparatus according to claim 1, comprising the steps that:

said gateway verifies, when said authentication data generating apparatus is connected, whether connection of said authentication data generating apparatus is the initial connection or not;

said gateway changes and records, when said connection is not the initial connection, an address of said customer premises apparatus;

said gateway transmits said changed address to said authentication data generating apparatus;

said authentication data generating apparatus records said received address;

said gateway transmits, when said connection is the initial connection, a verification information request to said authentication data generating apparatus;

whether said authentication data generating apparatus has generated authentication information or not is verified, said authentication information is used for generating the authentication data;

said authentication data generating apparatus generates and stores, when said authentication information is not yet generated, a pair of the authentication information and verification information;

said authentication data generating apparatus transmits the recorded verification information to said gateway; and said gateway records said received verification information.

5. A method of controlling a customer premises apparatus according to claim 1, comprising the steps that:

said controller transmits, when said authentication data generating apparatus is not connected to said gateway, an address request for requesting an address of said customer premises apparatus to said authentication data generating apparatus connected to said controller;

said authentication data generating apparatus transmits to said controller said address recorded therein;

said controller transmits a communication request including said received address to said gateway;

said gateway verifies that the address same as said address included in said communication request is recorded therein; and said gateway restricts, when the same address is not recorded, communication between said customer premises apparatus and said controller.

6. A method of controlling a customer premises apparatus according to claim 1, comprising the steps that:

said controller transmits, when said authentication data generating apparatus is not connected to said gateway, an address request for requesting an address of said customer premises apparatus to said authentication data generating apparatus connected to said controller;

said authentication data generating apparatus transmits to said controller said address recorded therein;

said controller transmits a communication request including said received address to said gateway;

said gateway verifies that the address same as that included in said communication request is recorded therein;

said gateway restricts, when the same address is not recorded, the communications between said customer premises apparatus and said controller;

said gateway transmits, when the same address is recorded, a verification data request including random numbers to said controller;

said controller transmits said received authentication data request to said authentication data generating apparatus;

said authentication data generating apparatus generates the authentication data using said random numbers included in a received authentication data request and recorded authentication information;

said authentication data generating apparatus transmits said generated authentication data to said controller;

said controller transmits said received authentication data to said gateway;

said gateway verifies said received authentication data using the recorded verification information; and said gateway restricts, when the verification fails, the communication between said customer premises apparatus and said controller.

7. A control system for a customer premises apparatus as an electronic apparatus which is located in a customer premises apparatus network, comprising:

a gateway for coupling the customer premises apparatus network and a network outside of customer premises, the gateway being configured for verifying connection with a portable authentication data generating apparatus;

a controller located in the network outside of customer premises to control said customer premises apparatus via the customer premises apparatus network; and the portable authentication data generating apparatus configured for generating authentication data used for a verification of the connection, wherein said gateway denies a connection from said controller which is located in the network outside of customer premises to control said customer premise apparatus via the customer premise apparatus network when said authentication data generating apparatus is attached to the gateway in the customer premises apparatus network, and allows the connection from said controller located in the network outside of customer premises when said authentication data generating apparatus is not attached to the gateway in the customer premises apparatus network but is attached to said controller.

8. A control system for a customer premises apparatus according to claim 7, wherein:

said gateway changes and records, when said authentication data generating apparatus is connected, an address of said customer premises apparatus;

said gateway transmits said changed address to said authentication data generating apparatus; and said authentication data generating apparatus records said received address.

9. A control system for a customer premises apparatus according to claim 7, wherein:

said gateway transmits, when said authentication data generating apparatus is connected, a verification information request to said authentication data generating apparatus;

said authentication data generating apparatus generates and records, when the authentication information is not yet generated, a pair of authentication information and verification information, said authentication information is used for generating the authentication data;

said authentication data generating apparatus transmits said recorded verification information to said gateway; and said gateway records said received verification information.

10. A control system for a customer premises apparatus according to claim 7, wherein:

said gateway verifies, when said authentication data generating apparatus is connected, whether connection of said authentication data generating apparatus is the initial connection or not;

said gateway changes and records, when the connection is not the initial connection, an address of said customer premises apparatus;

said gateway transmits said changed address to said authentication data generating apparatus;

said authentication data generating apparatus records said received address;

said gateway transmits, when the connection is the initial connection, a verification information request to said authentication data generating apparatus;

said authentication data generating apparatus generates and records, when the authentication information is not yet generated, a pair of authentication information and verification information, said authentication information is used for generating the authentication data;

said authentication data generating apparatus transmits said recorded verification information to said gateway; and said gateway records said received verification information.

11. A control system for a customer premises apparatus according to claim 7, wherein:

said controller transmits, when said authentication data generating apparatus is not connected to said gateway, an address request for requesting an address of said customer premises apparatus to said authentication data generating apparatus connected to said controller;

said authentication data generating apparatus transmits to said controller said address recorded therein;

said controller transmits a communication request including said received address to said gateway;

said gateway verifies that the address same as said address included in said communication request is recorded therein; and said gateway restricts, when the same address is not recorded, the communication between said customer premises apparatus and said controller.

12. A control system for a customer premises apparatus according to claim 7, wherein:

said controller transmits, when said authentication data generating apparatus is not connected to said gateway, an address request for requesting an address of said customer premises apparatus to said authentication data generating apparatus connected to said controller;

said authentication data generating apparatus transmits to said controller said address recorded therein;

said controller transmits a communication request including said received address to said gateway;

said gateway verifies that the address same as said address included in said communication request is recorded in said gateway;

said gateway restricts, when the same address is not recorded, the communication between said customer premises apparatus and said controller;

said gateway transmits, when the same address is recorded, an authentication data request including random numbers to said controller;

said controller transmits said received authentication data request to said authentication data generating apparatus;

said authentication data generating apparatus generates the authentication data using the random numbers included in a received authentication data request and recorded authentication information;

said authentication data generating apparatus transmits said generated authentication data to said controller;

said controller transmits said received authentication data to said gateway;

said gateway verifies said received authentication data using the recorded verification information; and said gateway restricts, when the verification fails, the communication between said customer premises apparatus and said controller.

13. A gateway for connecting a customer premises apparatus network and a network outside of customer premises, comprising:

means for verifying connection with a portable authentication data generating apparatus, said authentication data generating apparatus generating authentication data used for a verification of the connection; and means for denying a connection from a controller which is located in the network outside of customer premises to control a customer premise apparatus via the customer premise apparatus network when said authentication data generating apparatus is attached to the gateway in the customer premises apparatus network, and allowing the connection from a controller in the network outside of customer premises when said authentication data generating apparatus is not attached to the gateway in the customer premises apparatus network but is attached to said controller.

14. A gateway according to claim 13, comprising:

means for changing and recording an address of said customer premises apparatus when said authentication data generating apparatus is connected; and means for transmitting said changed address to said authentication data generating apparatus.

15. A gateway according to claim 13, comprising:

means for transmitting a verification information request to said authentication data generating apparatus when said authentication data generating apparatus is connected; and means for recording the verification information received from said authentication data generating apparatus.

16. A gateway according to claim 13, comprising:

means for verifying whether connection of said authentication data generating apparatus is the initial connection or not when said authentication data generating apparatus is connected;

means for changing and recording an address of said customer premises apparatus when the connection is not the initial connection;

means for transmitting said changed address to said authentication data generating apparatus;

means for transmitting a verification information request to said authentication data generating apparatus when the connection is the initial connection; and means for recording the verification information received from said authentication data generating apparatus.

17. A gateway according to claim 13, comprising:

means for verifying that an address of said customer premises apparatus same as an address included in a communication request received from said controller is recorded when said authentication data generating apparatus is not connected; and means for restricting the communication between said customer premises apparatus and said controller when the same address is not recorded.

18. A gateway according to claim 13, comprising:

means for verifying that an address of said customer premises apparatus same as an address included in a communication request received from said controller is recorded when said authentication data generating apparatus is not connected;

means for restricting the communication between said customer premises apparatus and said controller when the same address is not recorded;

means for transmitting an authentication data request including random numbers to said controller when the same address is recorded;

means for verifying authentication data received from said controller using the recorded verification information; and means for restricting the communication between said customer premises apparatus and said controller when the verification fails.

19. A customer premises apparatus as an electronic apparatus provided in a customer premises apparatus network which is controlled from a controller located on a network outside of the customer premises via the customer premises apparatus network, comprising:
  means for verifying connection with a portable authentication data generating apparatus, said authentication data generating apparatus being configured for generating authentication data which is used for a verification of the connection; and
  means for denying a connection from a controller which is located in the network outside of customer premises to control said customer premise apparatus via the customer premise apparatus network when said authentication data generating apparatus is attached to the gateway in the customer premises apparatus network, and allowing the connection from a controller located in the network outside of customer premises when said authentication data generating apparatus is not attached to the gateway in the customer premises apparatus network but is attached to said controller.

20. A customer premises apparatus according to claim 19, comprising:
  means for changing and recording an address of said customer premises apparatus when said authentication data generating apparatus is connected; and
  means for transmitting said changed address to said authentication data generating apparatus.

21. A customer premises apparatus according to claim 19, comprising:
  means for transmitting a verification information request to said authentication data generating apparatus when said authentication data generating apparatus is connected; and
  means for recording verification information received from said authentication data generating apparatus.

22. A customer premises apparatus according to claim 19, comprising:
  means for verifying whether the connection of said authentication data generating apparatus is the initial connection or not when said authentication data generating apparatus is connected;
  means for changing and recording an own address when the connection is not the initial connection;
  means for transmitting said changed address to said authentication data generating apparatus;
  means for transmitting a verification information request to said authentication data generating apparatus when the connection is the initial connection; and
  means for recording verification information received from said authentication data generating apparatus.

23. A customer premises apparatus according to claim 19, comprising:
  means for transmitting an authentication data request including random numbers to said controller when said authentication data generating apparatus is not connected;
  means for verifying authentication data received from said controller using the recorded verification information; and
  means for restricting the communication with said controller when the verification fails.

24. A method of controlling a customer premises apparatus according to claim 1, comprising the steps that:
  a pair of authentication information and verification information are generated and recorded in said controller when said controller is connected to said authentication data generating apparatus, said authentication information is used for generating authentication data;
  said controller transmits the recorded verification information to said authentication data generating apparatus;
  said authentication data generating apparatus records said received verification information;
  said gateway transmits, when connected to said authentication data generating apparatus, a verification information request to said authentication data generating apparatus;
  said authentication data generating apparatus transmits the recorded verification information to said gateway; and
  said gateway records said received verification information.

25. A control system for a customer premises apparatus according to claim 7, wherein:
  said controller generates and records, when connected to said authentication data generating apparatus, a pair of the authentication information and verification information, said authentication information is used for generating authentication data;
  said controller transmits the recorded verification information to said authentication data generating apparatus;
  said authentication data generating apparatus records said received verification information;
  said gateway transmits, when connected to said authentication data generating apparatus, a verification information request to said authentication data generating apparatus;
  said authentication data generating apparatus transmits said recorded verification information to said gateway; and
  said gateway records said received verification information.

26. A gateway according to claim 13, comprising:
  means for transmitting, when connected to said authentication data generating apparatus, a verification information request to said authentication data generating apparatus; and
  means for recording verification information received from said authentication data generating apparatus.

27. A gateway according to claim 13, comprising:
  means for transmitting, when not connected to said authentication data generating apparatus, an authentication data request including random numbers to said controller;
  means for verifying the authentication data received from said controller using recorded verification information; and
  means for restricting, when the verification fails, the communication between said customer premises apparatus and said controller.

28. A customer premises apparatus according to claim 19, comprising:
  means for transmitting, when connected to said authentication data generating apparatus, a verification information request to said authentication data generating apparatus; and
  means for recording verification information received from said authentication data generating apparatus.

29. A customer premises apparatus according to claim 19, comprising:
  means for transmitting, when not connected to said authentication data generating apparatus, an authentication data request including random numbers to said controller;

means for verifying said authentication data received from said controller using recorded verification information; and means for restricting, when the verification fails, the communication between said customer premises apparatus and said controller.

30. A method of controlling a customer premises apparatus according to claim 1, wherein the authentication data generating apparatus is configured to be attached to the controller which is located in the network outside of customer premises.

* * * * *